Figure 1:
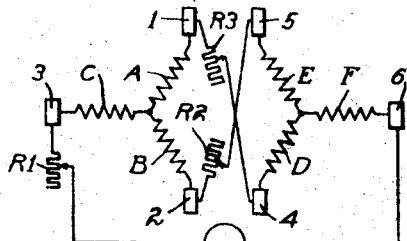

June 29, 1926.

L. H. A. CARR 1,590,419

ALTERNATING CURRENT MOTOR

Filed Jan. 8, 1923

WITNESSES:
H. B. Funk
O. B. Buchanan

INVENTOR
Laurence H. A. Carr.
BY
Eberley & Carr
ATTORNEY

Patented June 29, 1926.

1,590,419

UNITED STATES PATENT OFFICE.

LAURENCE H. A. CARR, OF HALE, ENGLAND, ASSIGNOR TO WESTINGHOUSE ELECTRIC & MANUFACTURING COMPANY, A CORPORATION OF PENNSYLVANIA.

ALTERNATING-CURRENT MOTOR.

Application filed January 8, 1923, Serial No. 611,230, and in England January 25, 1922.

This invention relates to alternating-current electric motors which are provided with distributed windings in their secondary members and are adapted for synchronous operation.

In an application of W. E. M. Ayres, Serial No. 418,969, filed Oct. 23, 1920, patented November 10, 1925, No. 1,561,297, and assigned to the Westinghouse Electric & Manufacturing Company, an electric motor is described in which the secondary member is provided with a plurality of windings which are used only in part or connected in parallel during the starting period and are connected in series when used for direct-current excitation during synchronous operation. During the latter period, that is to say, when the windings are connected in series, as illustrated and described in the said specification, a closed circuit will be formed by the secondary windings or parts of them which does not pass through the direct-current exciting source. However, the phase windings are connected in such a manner that there is no tendency for a current to circulate in this closed circuit, either under conditions of phase swinging during synchronous operation or in case the machine should pull out of synchronism and slipping occur. A closed circuit is obviously formed which includes the source of direct current but any circulating current induced in such closed circuit would necessarily pass through the said source.

According to the present invention, an electric motor of the kind above described is provided with a plurality of windings adapted both for induction-motor operation and for synchronous operation in the manner set forth in the application hereinbefore referred to but the windings, when arranged for synchronous operation are so connected that a closed circuit independent of the source of direct-current excitation is formed in which currents can circulate as in an induction-motor rotor winding, with the slip rings short-circuited. Consequently, if the motor should fall out of synchronism, the induction-motor torque produced would be more even than would be the case if induced current flowed only through the circuit containing the source of excitation. Furthermore, when running synchronously, the closed circuit will act as a damping winding.

The principal object of my invention is, therefore, to provide a machine of the character just mentioned, having a composite secondary winding, which is so disposed and connected that it may be employed, to the best advantage, as a combined damper winding and direct-current exciting winding.

A more specific object of my invention is to provide a novel polyphase exciting winding for machines requiring a good damper, said winding providing a low-impedance closed circuit within, or at the terminals of, the machine for circulating the damper currents.

With the foregoing and other objects in view, which will be apparent from the following description and claims, my invention consists in the combinations and details of structure referred to hereinafter and illustrated in the accompanying drawing, wherein Figures 1 to 10 are diagrammatic views of as many modifications or embodiments of my invention and illustrating the secondary or rotor windings of an electric motor connected to an external source for direct-current excitation, the primary windings being omitted for convenience of illustration.

In all of the figures, a rotor is shown having two three-phase windings, the phase windings being indicated at A, B, C, D, E, F and the external source of excitation being indicated at G.

Referring now to Fig. 1, the two windings ABC and DEF are shown as being star-connected, the terminals of the phase windings being connected respectively to six slip-rings 1 to 6. The directions of the individual elements of the windings, as shown in the drawing, correspond to their relative phase positions. The windings are connected in series so that one is reversed in sense with regard to the other. This may be done by connecting the slip-rings 1 and 4 together and also the slip-rings 2 and 5 together and connecting the source of direct-current to the slip-rings 3 and 6, as shown. During the starting period, external resistor $R_1$, $R_2$ and $R_3$ may be connected in series with the slip rings 1, 2 and 3 so that the motor starts as an induction motor, but, during the synchronous period, the resistors are cut out or short-circuited.

When the windings are connected as just described, the voltages induced in the closed circuit A, B, E, D do not add up to zero; in other words, the voltage between the ends of conductors D and E will assist and not oppose the voltage between the ends of conductors A and B. Consequently, the voltages resulting from rotor slip, either continuous or oscillating, as in phase swinging, do not oppose one another, and a current can circulate in the closed circuit formed by the phase conductors A, B, E, D without passing through the source G of direct-current excitation.

Figure 2:
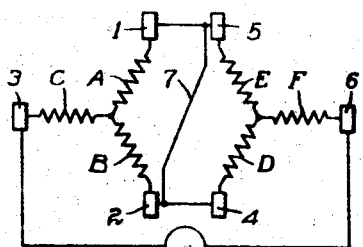

Fig. 2 shows another method of connection for synchronous operation in which the slip-rings 1 and 5 are connected and the slip-rings 2 and 4 are connected, the two connections being joined together by a conductor 7, shown as connected to the slip-rings 2 and 5. In this case, two closed circuits, namely, one through A, B, 7 and another through D, E, 7 are formed within which currents can circulate.

Figure 3:
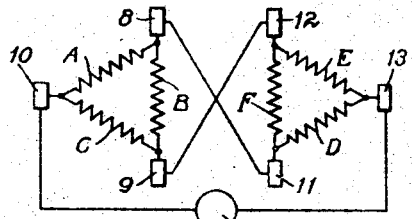

Fig. 3 illustrates the connections for two three-phase windings respectively connected in delta, the phase conductors being connected to slip rings 8, 9, 10, 11, 12 and 13, as shown. During the starting period, external resistors (not shown) may be connected to the slip-rings 8, 9, 10 of one three-phase winding, the slip rings 11, 12, 13 of the second winding being open-circuited, or any other starting arrangement may be made, as will be obvious. During the synchronous operation, the slip-rings 8 and 11 are connected and the slip-rings 9 and 12 are connected, the source of direct-current excitation being connected to the slip-rings 10 and 13, as shown. With this arrangement, two closed circuits are formed in which currents can circulate as follows:—The first circuit starts with phase conductor B and continues through slip-ring 8, slip-ring 11, phase conductor F, slip ring 12 and slip ring 9 back to phase conductor B; the second circuit starts with phase conductor A and continues through slip ring 8, slip ring 11, phase conductor D, phase conductor E, slip ring 12, slip ring 9 and phase conductor C, back to phase conductor A.

Figure 4:
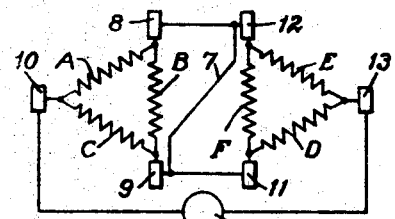

In Fig. 4, a similar arrangement of rotor windings is shown but the connections for synchronous operation correspond to those of Fig. 2, the slip-rings 8 and 12 and 9 and 11 being joined, and a conductor 7 connecting the slip-rings 9 and 12. In this way, closed circuits in which currents can circulate are formed as follows:—From phase conductor A, through slip-rings 8 and 12, conductor 7, slip-ring 9 and phase conductor C to phase conductor A; also from phase conductor D through phase conductor E, slip-ring 12, conductor 7, slip-rings 9 and 11 to phase conductor D again. Currents can also circulate in the circuit formed by the phase conductor B and conductor 7 and the phase conductor F and the conductor 7, respectively.

Figure 5:
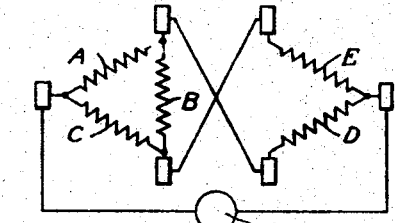

It will be observed that, in the combination shown in Fig. 3, the direct exciting current does not pass through phase conductors B and F, consequently, either or both of these conductors may be omitted, for example, in Fig. 5 the phase conductor F is omitted, the arrangements in other respects being the same as shown in Fig. 3 with the exception that the windings A, B and C will preferably be used for starting whereas, in Fig. 3, either or both of the two windings may conveniently be used for starting.

Figure 6:
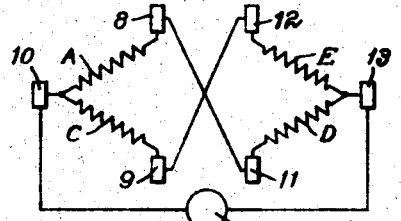

The arrangements when the phase conductor B and the phase conductor F are omitted are shown in Fig. 6 but the starting conditions in Fig. 6 will not be so good as those of Fig. 5 because a complete delta-connected phase winding will not be available for starting.

Figure 7:
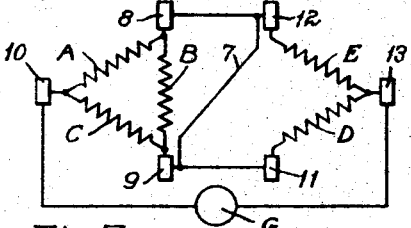
Figure 8:
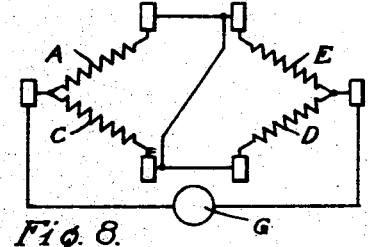

In Fig. 4 it will also be observed that the exciting current does not circulate in the windings B and F, consequently, one or both of these may be omitted, and the connections for synchronous operation will be as shown in Fig. 7 when the winding F is omitted and as shown in Fig. 8 when both windings B and F are omitted.

The omission of the parts of the winding, as illustrated in Figs. 5, 6, 7, 8, does not affect all the closed circuits formed independently of the direct-current source of excitation. The same observations, as regards starting, apply to Figs. 7 and 8 as to Figs. 5 and 6 previously described.

Figure 9:
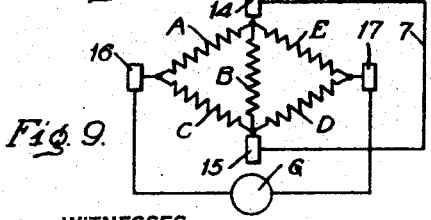

In the case of comparatively small machines, where splitting up of the rotor winding during starting is not necessary, some of the connections for synchronous operation may be permanently made in the rotor. Fig. 9, for example, shows the arrangement of Fig. 7 when the connections between the slip-rings 8 and 12 and 9 and 11 are permanently made inside the rotor. Four slip-rings only will be provided, which are indicated at 14, 15, 16 and 17. For starting, the slip-rings 14, 15 and 16 may be connected to a three-phase starting resistor (not shown) or the slip-rings 16 and 17 may be connected to one starting resistor (not shown) and the slip-rings 14 and 15 connected to a second starting resistor (not shown), or the four slip-rings 14 to 17 may be connected to a four-limb star-connected resistor (not shown).

Figure 10:
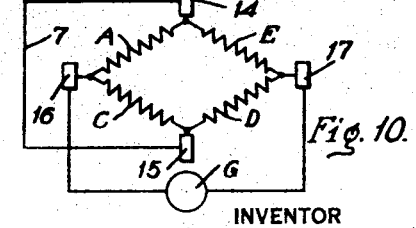

For synchronous operation, the source of direct-current excitation is connected to the slip-rings 16 and 17, and the slip-rings 14 and 15 are connected by the conductor 7, as shown. Three closed circuits will be formed which do not pass through the direct-current source, namely, one through the phase conductors A, C and conductor 7, another through the phase conductors D, E and the conductor 7 and the third through phase conductor B and conductor 7. It will be observed that, during the synchronous period, direct-current does not pass through the phase winding B. This phase winding may, therefore, be omitted, as shown in Fig. 10, but the starting conditions of the winding thus arranged will, in general, not be so good as with the winding arrangements shown in Fig. 9.

It will further be observed that, with the arrangements shown in Figs. 3 to 10, inclusive, the current density during the synchronous period is the same in all parts of the winding in which the excitation current is flowing, while, as previously remarked, in certain parts of the windings shown in Figs. 3, 4, 5, 7 and 9, no excitation current flows because such parts of the winding connect equi-potential points in the circuit.

The switching devices employed for effecting the several connections of the winding external to the motor may be of any suitable description.

I claim as my invention:

1. An electric motor of the kind described having its secondary member provided with two symmetrical polyphase windings connected for synchronous operation in conjunction with a source of direct-current excitation and providing a closed circuit independent of the source of direct-current excitation, whereby currents may circulate, as in an induction motor, with the slip rings short-circuited, thus providing a damper circuit during such synchronous operation.

2. A dynamo-electric machine having a plurality of exciting windings, each of said exciting windings having a plurality of phases of substantially 120° phase difference, a direct-current exciting circuit, means for connecting one terminal of said circuit to one terminal of one of said windings, means for connecting another terminal of said circuit to one terminal of the other winding, and means for inter-connecting the remaining terminals of the two windings.

3. A combined exciting and damper winding for a dynamo-electric machine comprising two independent symmetrical three-phase windings, a direct-current terminal connection for one phase of each of said windings, and cross-connections between the remaining phases of said windings.

4. A combined exciting and damper winding for a dynamo-electric machine comprising two independent star-connected three-phase windings, a direct-current terminal connection for one phase of each of said windings, cross-connections between the remaining phases of said windings, and starting resistors in series with the terminals of one of said windings.

5. A dynamo-electric machine having a plurality of exciting windings, each of said exciting windings having a plurality of phases of substantially 120° phase difference, a direct-current exciting circuit, means for connecting one terminal of said circuit to one terminal of one of said windings, means for connecting another terminal of said circuit to one terminal of the other winding, means for inter-connecting the remaining terminals of the two windings, and resistance means for facilitating the starting thereof.

6. A synchronous dynamo-electric machine comprising a field member, two similar symmetrical polyphase windings upon said field member, the corresponding phases of said two windings being displaced against each other by 180 electrical degrees, means for interconnecting some of the terminals of said windings to provide a low impedance path for currents induced in said windings, and means for circulating a direct-current between a non-interconnected terminal of one of said windings and a non-interconnected terminal of the other of said windings to excite said field member.

7. A synchronous dynamo-electric machine comprising a field member, two similar symmetrical polyphase windings upon said field member, the corresponding phases of said two windings being displaced against each other by 180 electrical degrees, means for interconnecting some of the terminals of said windings to provide a low impedance path for currents induced in said windings, and means for circulating a direct-current between a non-interconnected terminal of one of said windings and a non-interconnected terminal of the other of said windings to excite said field member, said last-mentioned terminals being in phase opposition with respect to each other and symmetrical with respect to said interconnected terminals.

8. A synchronous dynamo-electric machine comprising an armature, a polyphase winding on said armature, a field member co-operating with said armature, two symmetrical three-phase windings upon said armature, the corresponding phases of said two windings being displaced against each other to provide three pairs of phases disposed in phase opposition, respectively, means for connecting a source of direct current to the terminals of one pair of said phases to excite said field member and means for so interconnecting the remaining phases as to provide a low resistance path for current induced therein by currents in said armature and at the same time complete the circuit for said direct current.

9. A synchronous dynamo-electric machine comprising an armature, a polyphase winding on said armature, a field member co-operating with said armature, two symmetrical three-phase windings upon said armature, the corresponding phases of said two windings being displaced against each other to provide three pairs of phases disposed in phase opposition, respectively, means for connecting a source of direct-current to the terminals of one pair of said phases to excite said field member, means for so interconnecting the remaining phases as to provide a low resistance path for current induced therein by currents in said armature and at the same time complete the circuit for said direct current and means for introducing resistors in the circuit of said induced current for starting said machine.

In testimony whereof, I have hereunto subscribed my name this 20th day of December, 1922.

LAURENCE H. A. CARR.